US012169263B2

(12) United States Patent
James et al.

(10) Patent No.: US 12,169,263 B2
(45) Date of Patent: Dec. 17, 2024

(54) SENSOR ASSEMBLY FOR WIRELESS TRANSFER OF DATA AND POWER IN A WELLBORE

(71) Applicant: Halliburton Energy Services, Inc., Houston, TX (US)

(72) Inventors: Paul James, Spring, TX (US); Joseph Chakkungal Joseph, The Woodlands, TX (US); Ravi Vayeda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 316 days.

(21) Appl. No.: 17/708,875

(22) Filed: Mar. 30, 2022

(65) Prior Publication Data
US 2023/0314650 A1 Oct. 5, 2023

(51) Int. Cl.
*G01V 3/10* (2006.01)
*E21B 33/03* (2006.01)
*E21B 47/00* (2012.01)
*H02J 50/10* (2016.01)

(52) U.S. Cl.
CPC ............... *G01V 3/10* (2013.01); *E21B 33/03* (2013.01); *E21B 47/00* (2013.01); *H02J 50/10* (2016.02)

(58) Field of Classification Search
CPC ........ G01V 3/10; G01V 11/002; G01V 11/00; E21B 33/03; E21B 47/00; E21B 41/00; H02J 50/10
See application file for complete search history.

(56) References Cited

U.S. PATENT DOCUMENTS

| 8,203,461 B2 | 6/2012 | Tubel |
| 8,689,621 B2 | 4/2014 | Godager et al. |
| 9,869,176 B2 | 1/2018 | Dickson et al. |
| 2003/0098799 A1 | 5/2003 | Zimmerman |
| 2014/0216757 A1 | 8/2014 | Kleppa |

(Continued)

FOREIGN PATENT DOCUMENTS

| CN | 1854460 | 11/2006 |
| EP | 3511517 B1 | 5/2020 |

(Continued)

OTHER PUBLICATIONS

PCT App. No. PCT/US2022/022585, "International Search Report and the Written Opinion", Dec. 27, 2022, 11 pages.

*Primary Examiner* — Tarun Sinha
(74) *Attorney, Agent, or Firm* — Kilpatrick Townsend & Stockton LLP

(57) ABSTRACT

A system can include a sensor assembly and a wellhead flange sized to receive the sensor assembly. The system can also include a seal that can be positioned between the sensor assembly and the wellhead flange for sealing the wellhead flange from an external environment. The system can also include an inner coil that can be positioned within the sensor assembly. The inner coil may be able to communicate wirelessly with an outer coil that can be positioned around the sensor assembly for transmitting data and power with respect to the wellhead flange. The system can also include a sensor positionable in a through bore of the wellhead flange. The sensor can be coupled with the inner coil for transmitting and receiving data and power with respect to the wellhead flange.

20 Claims, 8 Drawing Sheets

(56) References Cited

U.S. PATENT DOCUMENTS

| | | | | |
|---|---|---|---|---|
| 2018/0340391 A1* | 11/2018 | Gray | ............ | H02J 50/10 |
| 2019/0363634 A1* | 11/2019 | Pierrat | ............ | G01V 3/02 |
| 2020/0362691 A1* | 11/2020 | Joshi | ............ | E21B 47/12 |

FOREIGN PATENT DOCUMENTS

| | | |
|---|---|---|
| WO | 2017203293 | 11/2017 |
| WO | 2019178019 A1 | 9/2019 |

* cited by examiner

SENSOR ASSEMBLY FOR WIRELESS TRANSFER OF DATA AND POWER IN A WELLBORE

TECHNICAL FIELD

The present disclosure relates generally to wellbore tools and, more particularly (although not necessarily exclusively), to sensor assemblies that can be used to transfer data and power wirelessly in a wellbore.

BACKGROUND

In an oil-and-gas industry context, a tree assembly can include a set of valves, spools, and fittings that can be connected to a wellhead of a completed well to control a flow of formation fluids from the well during production. The tree assembly can be used for wellbore operations in subsea wells or surface wells. Tree assemblies can include sensors for gathering data that may be related to a property of the well or fluids in the well, and can provide the sensors with isolation from an environment. Tree assemblies include wires that are physically connected to the sensors for transmitting power or data with respect to the wellbore. The wires may be isolated from the environment with at least two seals to prevent fluids from the wellbore from migrating into the environment. The seals may be welds, hermetic bulkhead pins, or electrical connectors.

DETAILED DESCRIPTION

Figure 1:
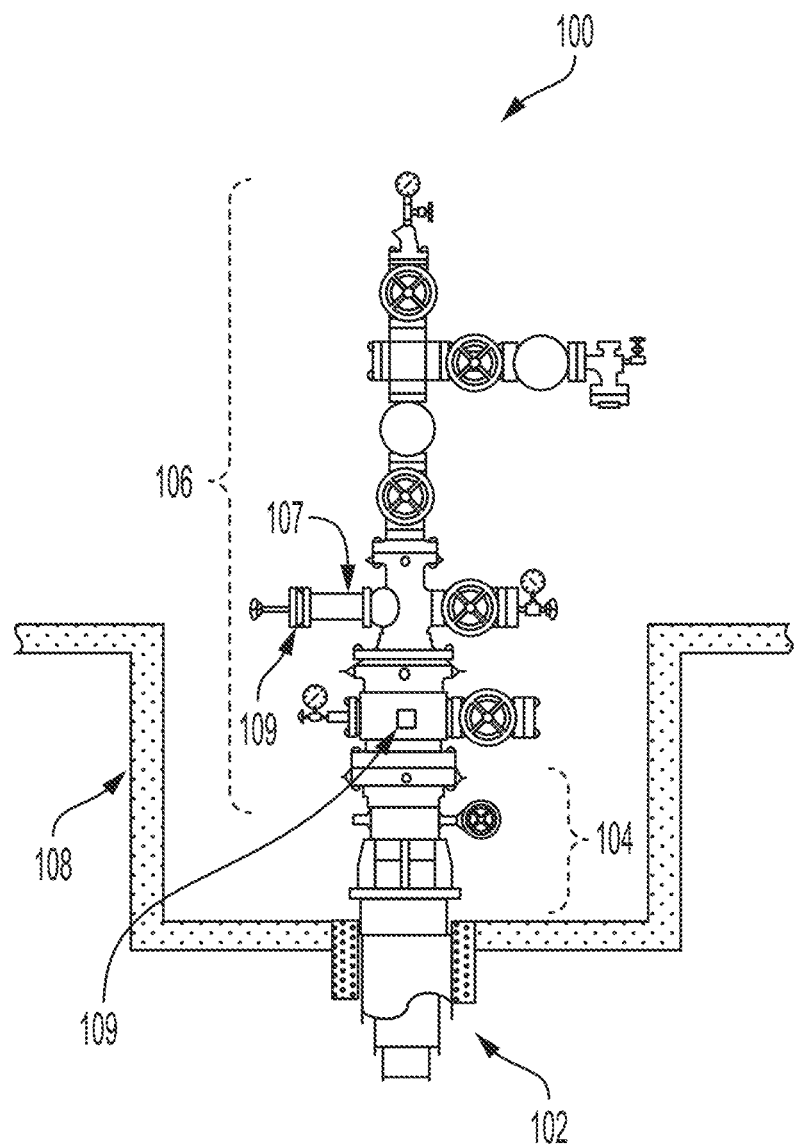
FIG. 1 is a diagram of a wellhead of a well that includes a tree assembly according to one example of the present disclosure.

Certain aspects and examples of the present disclosure relate to a sensor assembly that can be used to transmit data and power wirelessly in a wellbore. The tree assembly can include a set of valves, spools, and fittings that can be connected to a wellhead flange of a completed well. The wellhead flange may form a pressure barrier between wellbore fluids in the well and an environment. The wellhead flange may also include a through bore that may be a cavity on the exterior of the wellhead flange with respect to the wellbore fluids. The sensor assembly can include a sensor for gathering data related to a property of the well or fluids in the well. The sensor can be positioned within the wellhead flange, and may be in close proximity to the wellbore fluids. The sensor assembly may include an inner coil that may be connected to the sensor and an outer coil for transmitting data and power wirelessly from the sensor to a receiver in the external environment. By energizing the inner coil, a first magnetic field may be generated that can cause a current in the outer coil for transmitting power and data to the outer coil. Similarly, by energizing the outer coil, a second magnetic field may be generated that can cause a current in the inner coil for transmitting power and data to the inner coil.

In some examples, transmitting data wirelessly can allow a signal from the sensor to be transmitted through the pressure barrier to a receiver in the environment without requiring a physical connection to the sensor. In such examples, the wellhead flange may not require independent seals or barriers. In some examples, the wellhead flange may not include elastomers, and therefore, may be resistant to degradation that may be caused by compression cycles or degradation that may be caused by temperature cycles. The wellhead flange may also be able to operate at low temperatures, such as temperatures below zero degrees Celsius. The wellhead flange may be free of welds or threads.

In some examples, the sensor may be connected to the inner coil that may be encapsulated by a tree flange of the sensor assembly and wellhead flange. The sensor may be connected to the inner coil with a weld. The inner coil may be connected to the tree flange with a positioning, fastening, or retaining device, such as one or more screws. The tree flange can have an interface that is designed to couple to an interface of the wellhead flange. The wellhead flange may be an API 6A compliant wellhead flange or any other suitable wellhead flange. The tree flange can have bolt holes which can be used to bolt the tree flange to the wellhead flange. There may be a seal between the tree flange and wellhead flange that can prevent wellbore fluids from leaking into the environment. When the tree flange is bolted to the wellhead flange, the sensor can be located inside the through bore of wellhead flange and in close proximity to the wellbore fluids. For example, the sensor may be a temperature sensor, a pressure sensor, or any other kind of sensor or transducer. The sensor may include multiple sensors that can be coupled to the same inner coil. Data collected by the sensor can be sent to an inner coil, which can be further transmitted to an outer coil that may be located outside the tree flange. The outer coil can be connected to a tubing-encapsulated conductor, which can carry the data back to a well monitoring system.

Some examples may include two independent sensors inside a single tree flange. A first sensor may be connected to a first inner coil that may transmit a first signal to a first outer coil, which can be connected to the well monitoring system by a first tubing-encapsulated conductor. Similarly, a second sensor may be connected to a second inner coil that may transmit a second signal to a second outer coil, which can be connected to the well monitoring system by a second tubing-encapsulated conductor. Interference between pairs of coils can be prevented by spacing the pairs of coils apart from each other such that the pairs of coils may be non-coplanar with respect to one another.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a diagram of a wellhead 104 of a well 100 that includes a tree assembly 106 according to one example of the present disclosure. The well 100 may include a wellbore 102 that may drilled into a rock formation 108. The wellhead 104 attached to the tree assembly 106 which may include a wellhead flange 107. The wellhead flange 107 may be an API 6A compliant wellhead flange or any other suitable wellhead flange 107. The tree assembly 106 can include a set of valves, spools, and fittings for controlling a flow of formation fluids from the well 100 during production operations. The tree assembly 106 can include a swab valve that can be used for running a wireline or coiled tubing into the well 100. The tree assembly 106 may include a tree valve that can be coupled to a flow line for transferring fluids in or out of the well 100. In some examples, the tree assembly 106 can be used to inject a fluid into the well 100. The tree assembly 106 can be used in subsea or surface wells 100. The tree assembly 106 can include a sensor assembly 109 for measuring a property of the well 100 or a property of a fluid in the well 100.

The sensor assembly 109 may be able to transmit power and data wirelessly between the sensor assembly 109 and electronics that may be communicatively coupled to the tree assembly 106. The sensor assembly 109 may be a pressure sensor, a temperature sensor, or any other suitable sensor assembly or transducer assembly. The electronics may be communicatively coupled to the tree assembly 106 via a junction box. The sensor assembly 109 may include an inner coil that may be connected to the sensor assembly 109. The sensor assembly 109 may also include an outer coil that may be positioned around an exterior of the sensor assembly 109. The inner coil may be communicatively coupled to the outer coil. By energizing the inner coil, a first magnetic field may be generated that can cause a current in the outer coil for transmitting power and data to the outer coil. Similarly, by energizing the outer coil, a second magnetic field may be generated that can cause a current in the inner coil for transmitting power and data to the inner coil.

In some examples, data from the sensor assembly 109 may be used for controlling wellbore operations. For example, the sensor assembly 109 may detect a decrease in an outflow pressure and cause a well monitoring system to trigger an alarm. The outflow pressure may be a pressure that can cause fluids such as hydrocarbons to travel from a bottom of the well 100 to a top of the well 100 where the fluids can be extracted and sent to a flow line. Triggering an alarm based on a decrease in the outflow pressure may prevent halted production and minimize a downtime of the well 100 during a production process.

Figure 2:
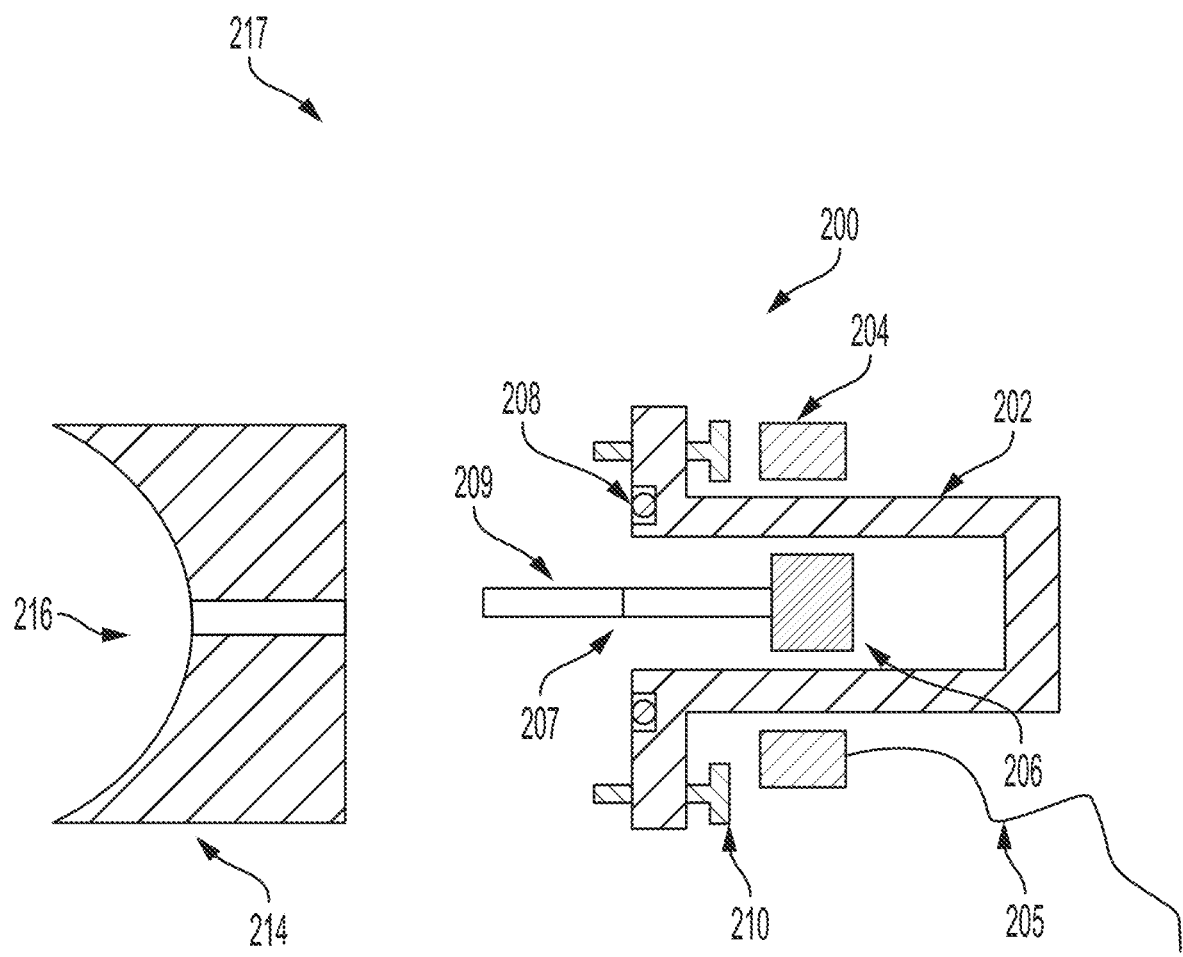
FIG. 2 is a sectional side-view of an example of a sensor assembly that can transfer data and power wirelessly in a wellbore according to one example of the present disclosure.

FIG. 2 is a sectional side-view of an example of a sensor assembly 200 that can transfer data and power wirelessly in a wellbore according to one example of the present disclosure. The sensor assembly 200 can include a tree flange 202 that can be coupled with a wellhead flange 214. The tree flange 202 can be fastened to the wellhead flange 214 with one or more bolts 210. The tree flange 202 may include a seal 208 for isolating contents that may be encapsulated by the wellhead flange 214 and tree flange 202. In some examples, the seal 208 may be the only seal between the wellhead flange 214 and the tree flange 202. The tree flange 202 may also include a pressure barrier that can prevent well fluids such as formation fluids from the well 216 from leaking out into an environment 217. In some examples, the sensor assembly 200 having the seal 208 may prevent leak paths from forming in the pressure barrier and provide the sensor assembly 200 with additional resilience to environmental conditions. This can further prevent well fluids from leaking out into the environment 217. For example, the seal 208 may be resistant to degradation that may be caused by compression cycles or degradation that may be caused by temperature cycles. Resistance to degradation that may be caused by temperature cycles may allow the sensor assembly 200 to operate at low temperatures, such as temperatures below zero degrees Celsius or 32 degrees Fahrenheit.

The wellhead flange 214 may include a through bore that can receive a sensor 209. The sensor 209 may be a temperature sensor, a pressure sensor, or any similar sensor or transducer. The sensor 209 may be encapsulated by a combination of the wellhead flange 214 and the tree flange 202 when the wellhead flange 214 receives the tree flange 202. The sensor 209 may include multiple sensors or transducers. The sensor 209 may be coupled to an inner coil 206 with a weld 207. The inner coil 206 may be communicatively coupled to an outer coil 204 that may be positioned outside the tree flange 202 for transmitting data and power with respect to the wellhead flange. The outer coil 204 may be coplanar with the inner coil 206. The outer coil 204 may be connected to a tubing-encapsulated conductor 205 that can send data to an external receiver, such as a well monitoring system.

By energizing the inner coil 206, a first magnetic field may be generated by the inner coil 206 that can cause a current in the outer coil 204 for transmitting power and data to the outer coil. Similarly, by energizing the outer coil 204, a second magnetic field may be generated by the outer coil 204 that can cause a current in the inner coil 206 for transmitting power and data to the inner coil 206. Transmitting data obtained from the sensor 209 to the well monitoring system may be used for controlling wellbore operations. For example, the sensor 209 may detect a decrease in an outflow pressure and cause the well monitoring system to trigger an alarm. The outflow pressure may be a pressure that can cause fluids such as hydrocarbons to travel from a bottom of a well to a top of the well where the fluids can be extracted and sent to a flow line. Triggering an alarm based on a decrease in the outflow pressure may prevent halted production and minimize a downtime of the well during a production process.

Figure 3:
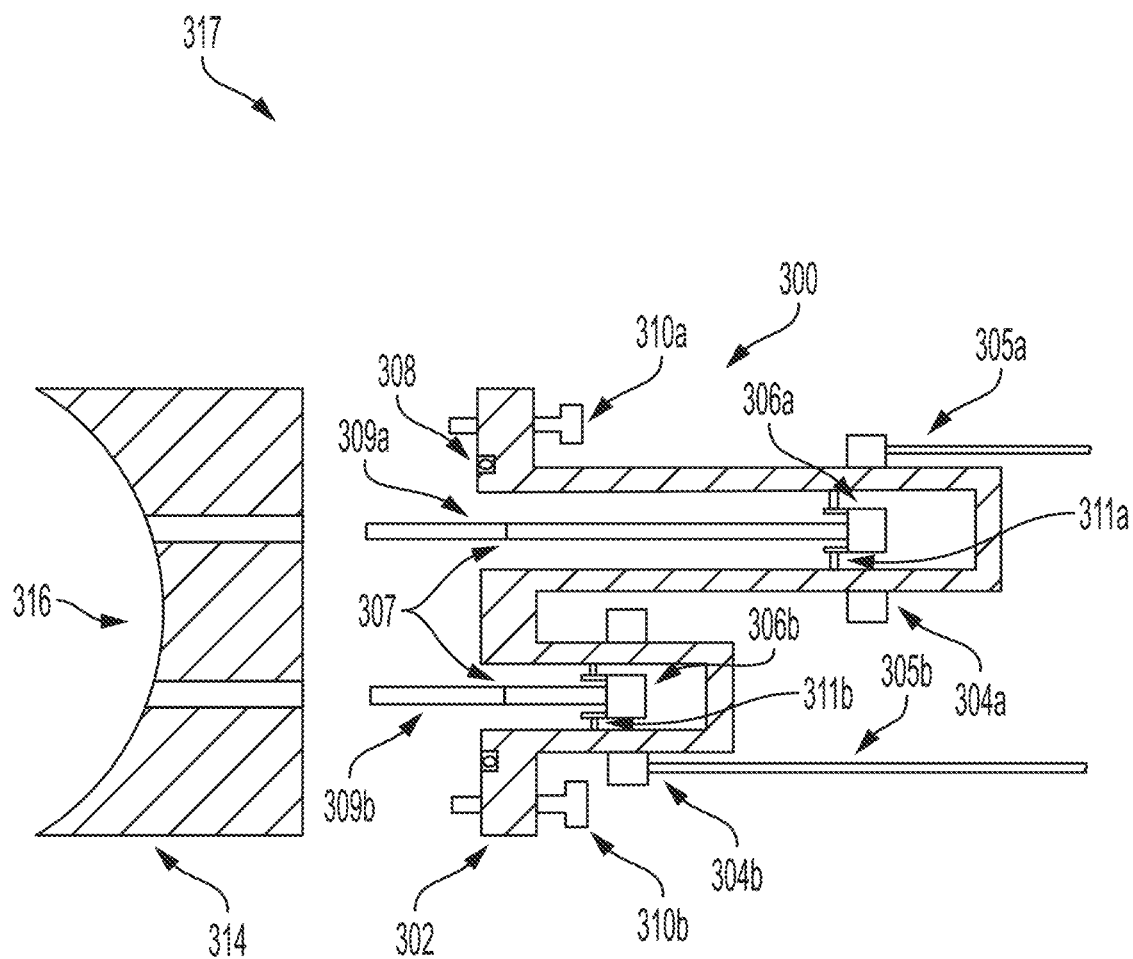
FIG. 3 is a sectional side-view of a wellhead flange and a sensor assembly with multiple sensors according to one example of the present disclosure.

FIG. 3 is a sectional side-view of a wellhead flange 314 and a sensor assembly 300 with multiple sensors 309a-b according to one example of the present disclosure. The wellhead flange 314 can provide a pressure barrier that can prevent fluids in the well 316 from leaking into an environment 317.

The sensor assembly 300 can include a tree flange 302 that can be coupled with the wellhead flange 314. The tree flange 302 can be fastened to the wellhead flange 314 with two or more bolts 310a-b. Fastening the tree flange 302 to the wellhead flange 314 may isolate the sensors 309a-b from the environment 317. The wellhead flange 314 may include a seal 308 for isolating contents that may be encapsulated by the wellhead flange 314 and tree flange 302. The seal 308 may be the only seal 308 in the sensor assembly 300 and may further isolate the sensors 309a-b. The wellhead flange 314 may also include a pressure barrier that can prevent formation fluids from the well 316 from leaking out into the environment 317. In some examples, the sensor assembly 300 having only one seal 308 may prevent leak paths in the pressure barrier and provide the sensor assembly 300 with additional resilience to environmental conditions. For example, the seal 308 may be resistant to degradation that may be caused by compression cycles or degradation that may be caused by temperature cycles. Resistance to degradation that may be caused by temperature cycles may allow the sensor assembly 300 to operate at low temperatures, such as temperatures below zero degrees Celsius or 32 degrees Fahrenheit.

The wellhead flange 314 may be an API 6A compliant wellhead flange or any other suitable wellhead flange 314. The wellhead flange 314 may include multiple through bores that can receive sensors 309a-b. The sensors 309a-b may be similar or different and may include temperature sensors, pressure sensors, or any other sensors or transducers. The sensors 309a-b may be coupled to their respective inner coils 306a-b with welds 307. The inner coils 306a-b may be held in place with a retention device such as screws 311a-b. The inner coils 306 may be communicatively coupled to their respective outer coils 304a-b that may be positioned outside the tree flange 302 for transmitting data and power with respect to the wellhead flange 314. The outer coils 304a-b may be coplanar with the inner coils 306a-b. To avoid interference, pairs of coils may be positioned such that the pairs of coils are non-coplanar with respect to each other. By energizing the inner coils 306a-b, a first magnetic field may be generated that can cause a current in the outer coils 304a-b. Similarly, by energizing the outer coils 304a-b, a second magnetic field may be generated that can cause a current in the inner coils 306a-b.

The outer coils 304a-b may be connected to tubing-encapsulated conductors 305a-b that can send data to an external receiver, such as a well monitoring system. Transmitting data obtained from the sensors 309a-b to the well monitoring system may be used for controlling wellbore operations. For example, one or more of the sensors 309a-b may detect a decrease in an outflow pressure and cause the well monitoring system to trigger an alarm. The outflow pressure may be a pressure that can cause fluids such as hydrocarbons to travel from a bottom of a well to a top of the well where the fluids can be extracted and sent to a flow line. Triggering an alarm based on a decrease in the outflow pressure may prevent halted production and minimize a downtime of the well during a production process.

Figure 4:
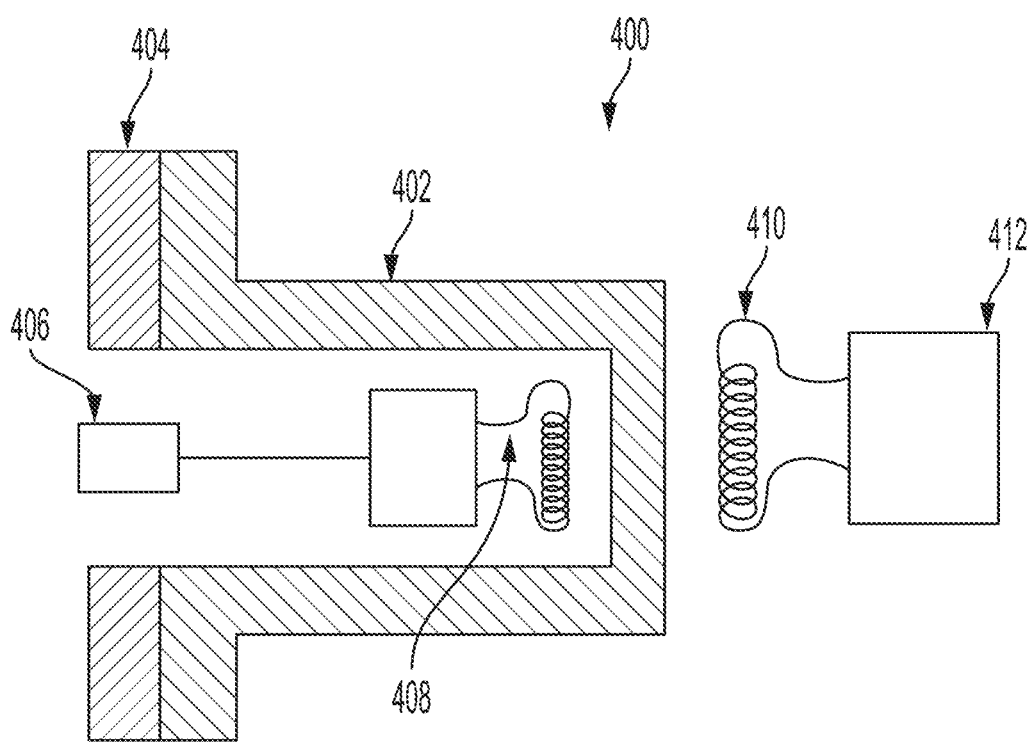
FIG. 4 is a sectional side-view of an example of a sensor assembly with a non-magnetic material and a magnetically permeable material according to one example of the present disclosure.

FIG. 4 is a sectional side-view of an example of a sensor assembly 400 with a non-magnetic material 404 and a magnetically permeable material 402 according to one example of the present disclosure. The magnetically permeable material 402 may be a material with internal dipoles that can become oriented with respect to an applied magnetic field, thereby blocking the applied magnetic field from passing through the material. In some examples, the magnetically permeable material 402 may include iron, steel, silicon steels or any alloys thereof. Conversely, the non-magnetic material 404 may be a material with internal dipoles that may not become oriented with respect to an applied magnetic field, thereby allowing the applied magnetic field to pass through.

The sensor assembly 400 can include a sensor 406 that may be coupled to an inner coil 408 with a weld or wire. The sensor 406 may be positioned in a through bore of a wellhead flange and in close proximity to a wellbore fluid for obtaining a measurement that may correspond to a property of the wellbore fluid. The sensor 406 may be isolated from an environment 417 when the sensor assembly 400 is fastened to the wellhead flange, The sensor assembly 400 may be fastened to the wellhead flange by bolts, threads, or other fastening techniques. The inner coil 408 may be able to transmit data and power to an outer coil 410 that may be coupled to a receiver 412. For example, the receiver 412 may be a well monitoring system that can receive data related to a status of a well that the sensor assembly 400 may be coupled to. An orientation of the non-magnetic material 404 and the magnetically permeable material 402 may determine how electromagnetic signals interact with the sensor assembly 400. In some examples, the non-magnetic material 404 may define a path or a set of paths through portions of the sensor assembly 400 through which a magnetic field may propagate among the inner coil 408 and the outer coil 410. In contrast, the magnetically permeable material 402 may define one or more regions of the sensor assembly 400 through which a magnetic field may not be able to propagate among the inner coil 408 and the outer coil 410. The magnetically permeable material 402 may prevent electromagnetic interference from components proximate the sensor assembly 400 that may generate electromagnetic signals. In some examples, the inner coil 408 may be energized to produce a magnetic field for transmitting data and power wirelessly to the outer coil 410 with respect to the sensor assembly 400.

Figure 5:
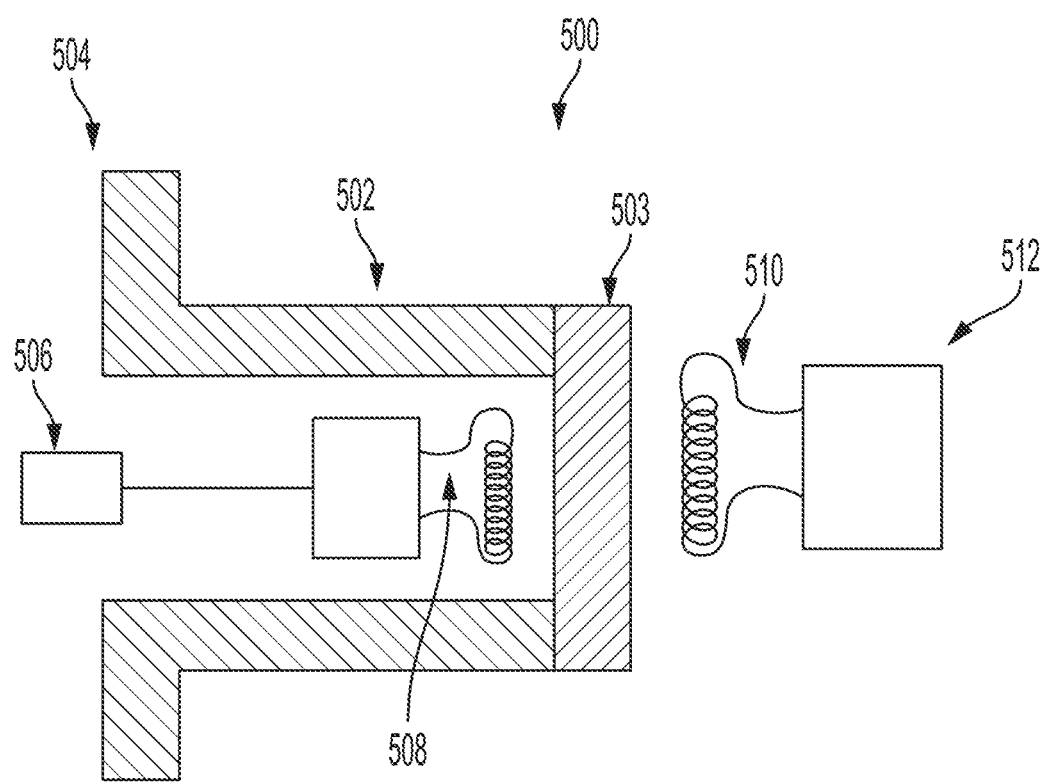
FIG. 5 is a sectional side-view of another example of a sensor assembly with a non-magnetic material and a magnetically permeable material according to one example of the present disclosure.

FIG. 5 is a sectional side-view of another example of a sensor assembly 500 with a magnetically permeable material 502 and a non-magnetic material 503 according to one example of the present disclosure. The magnetically permeable material 502 may be a material with internal dipoles that can become oriented with respect to an applied magnetic field, thereby blocking the applied magnetic field from passing through the material. In some examples, the magnetically permeable material 502 may include iron, steel, silicon steels or any alloys thereof. The non-magnetic material 503 may include nickel or any alloys thereof. An orientation of the magnetically permeable material 502 and the non-magnetic material 503 may determine how electromagnetic signals interact within the sensor assembly 500. The sensor assembly 500 can be used in subsea or surface wells. The sensor assembly 500 can include a sensor 506 that may be connected to an inner coil 508. The sensor 506 may be positioned in a through bore of a wellhead flange and in close proximity to a wellbore fluid for obtaining a measurement that may correspond to a property of the wellbore fluid. The sensor 506 may be a temperature sensor, a pressure sensor or any other type of sensor or transducer. The sensor 506 may be encapsulated by the sensor assembly 500 when it is coupled to the wellhead flange.

The inner coil 508 may be energized for creating a magnetic field. The inner coil 508 may be communicatively coupled to an outer coil 510 for transmitting data and power wirelessly with respect to a wellhead flange. The non-magnetic material 503 may be positioned between the outer coil 510 and the inner coil 508 for defining a path through which a magnetic field may be able to propagate. The path through which the magnetic field may propagate may allow data or power to be transmitted among the inner coil and the outer coil. The magnetic field may be induced by a current in the inner coil 508 and may energize the outer coil 510 for transmitting data or power. Alternately the magnetic field may be induced by a current in the outer coil 510 and may energize the inner coil 508 for transmitting data or power. The outer coil 510 may be communicatively coupled to a receiver 512, such as a well monitoring system. The data obtained from the sensor 506 may be used for controlling wellbore operations. For example, the sensor 506 may detect a decrease in an outflow pressure and cause the well monitoring system to trigger an alarm. Triggering an alarm based on a decrease in the outflow pressure may prevent halted production and minimize a downtime of the well during a production process.

Figure 6:
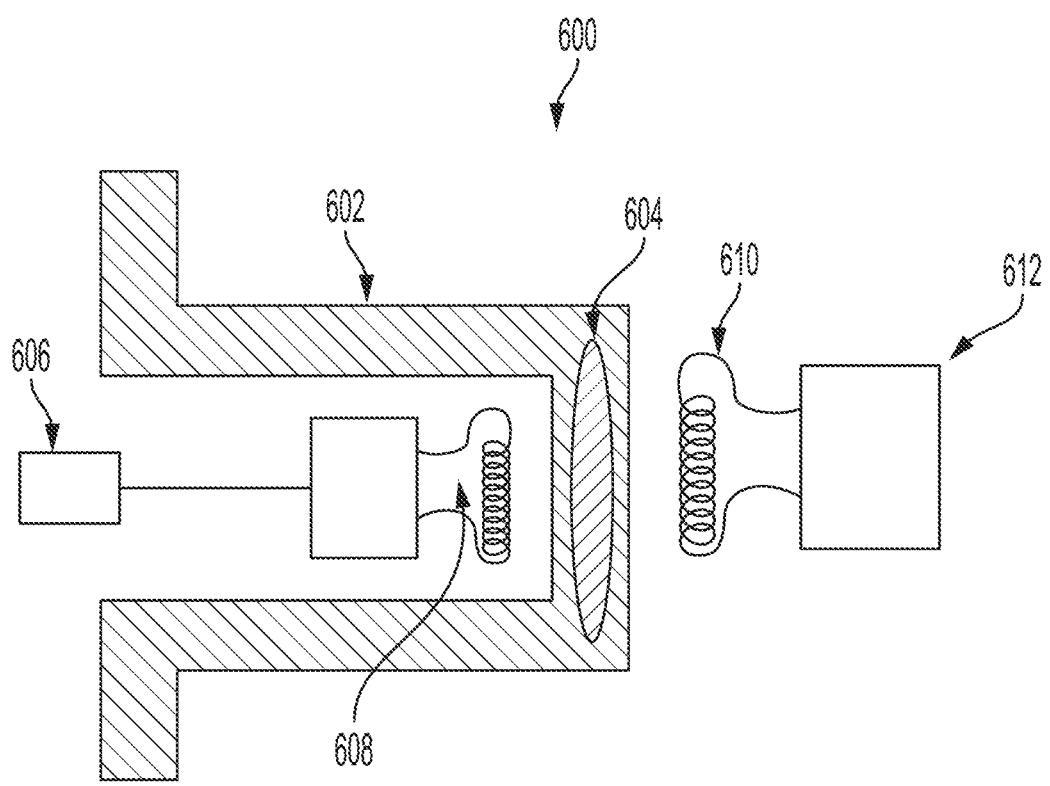
FIG. 6 is a sectional side-view of a sensor assembly with composite structure using materials of varying magnetic permeability to aid in concentrating magnetic flux lines for wireless transfer of data and power to and from a sensor according to one example of the present disclosure.

FIG. 6 is a sectional side-view of a sensor assembly 600 with a composite structure using a first material 602 of a first magnetic permeability and a second material 604 of a second magnetic permeability to concentrate magnetic flux lines for wireless transfer of data and power relative to a sensor 606 according to one example of the present disclosure. The sensor assembly 600 can be used in subsea or surface wells. In some examples, the material 604 and material 602 may be fabricated with 3D printing or other stereolithographic fabrication techniques. This may allow a geometry or morphology of the material 604 to be tuned and may improve a transfer efficiency associated with the sensor assembly 600. The first material 602 may prevent a magnetic field from propagating through parts of the sensor assembly 600, thereby reducing an interference with nearby electrical components.

Portions of the sensor assembly 600 that include the magnetically permeable material 604 may define a path in the sensor assembly 600 through which a magnetic field may be able to propagate. The sensor assembly 600 may include a sensor 606 that may be positioned in a through bore of a wellhead flange and may be positioned in close proximity to a wellbore fluid. The sensor 606 may be used to obtain a measurement of a property of the wellbore fluid. The sensor 606 may be a temperature sensor, a pressure sensor or any other type of sensor or transducer. The sensor 606 may be communicatively coupled to an inner coil 608. The inner coil 608 may be wirelessly communicatively coupled to an outer coil 610 that may be positioned outside of the sensor assembly 600. The outer coil 610 may be communicatively coupled to a receiver 612, such as a well monitoring system. Additionally or alternatively, the outer coil 610 may be coupled to a junction box that may transmit data from the outer coil 610 to a destination external to the sensor assembly 600. By energizing the inner coil 608, a first magnetic field may be generated by the inner coil 608 that can cause a current in the outer coil 610 for transmitting power and data to the outer coil 610. Similarly, by energizing the outer coil 610, a second magnetic field may be generated by the outer coil 610 that can cause a current in the inner coil 608 for transmitting power and data to the inner coil 608. Transmitting data obtained from the sensor 606 to the well monitoring system may be used for controlling wellbore operations.

The data from the sensor 606 may be used for controlling wellbore operations. For example, the sensor 606 may detect a decrease in an outflow pressure and cause the well monitoring system to trigger an alarm. Triggering an alarm based on a decrease in the outflow pressure may prevent halted production and minimize a downtime of the well during a production process.

Figure 7:
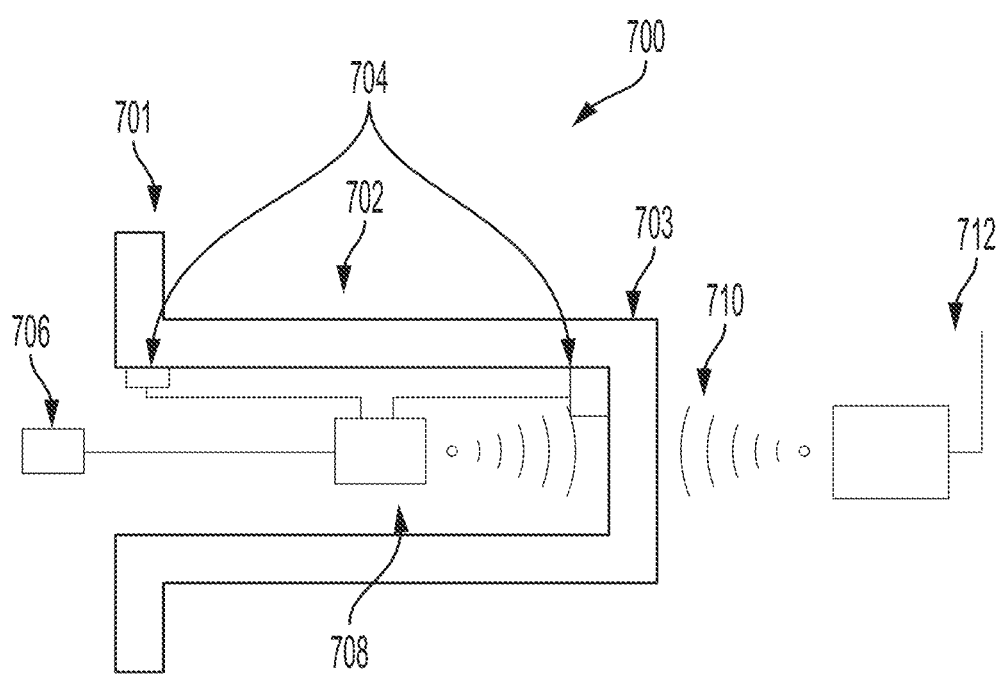
FIG. 7 is a sectional side-view of a sensor assembly that can use the Seebeck Effect for generating power locally and wirelessly transferring data in a wellbore according to one example of the present disclosure.

FIG. 7 is a sectional side-view of a sensor assembly 700 that can use the Seebeck Effect for generating power locally and wirelessly transferring data in a wellbore according to one example of the present disclosure. The sensor assembly 700 can be used in subsea or surface wells. The sensor assembly 700 may include a tree flange 702 that can include a first metal 701 and a second metal 703. The sensor assembly 700 may be fastened to a wellhead flange with bolts, screws or any other type of fastener. The first metal 701 may have a first chemical potential and the second metal 703 may have a second chemical potential and a third metal 704 may have a third chemical potential. The sensor assembly 700 may include a sensor 706 that can be coupled to a transmitter 708. For example, the transmitter 708 may be an RF transmitter or an inductive transmitter.

The sensor assembly 700 may generate power locally via the Seebeck effect. The Seebeck effect may allow a voltage to be generated among a first material at a first temperature and a second material at a second temperature. The first temperature may be different than the second temperature. When coupled together, the first material and the second material may behave as a thermoelectric generator. The sensor assembly 700 may include a third material 704 for forming the first and the second electrical junctions. The electrical junctions 704 and 701, and 704 and 703 may be coupled to the transmitter 708, the sensor 706, or both. Coupling the material 704 to the transmitter 708 may allow the transmitter 708 to operate without requiring an internal battery or an external power source. The transmitter may send signals 710 to a receiver 712 that may be external to the sensor assembly 700. The receiver 712 may be an antenna or any other suitable receiver 712 for receiving signals 710 from the transmitter 708. The sensor 706 may be positionable in a through bore of a wellhead flange that may be sized to receive the tree flange 702. The sensor 706 may obtain measurements that can be related to properties of a wellbore fluid. The measurements may be used for controlling wellbore operations. For example, the sensor 706 may detect a decrease in an outflow pressure and cause a well monitoring system to trigger an alarm. Triggering an alarm based on a decrease in the outflow pressure may prevent halted production and minimize a downtime of the well during a production process.

Figure 8:
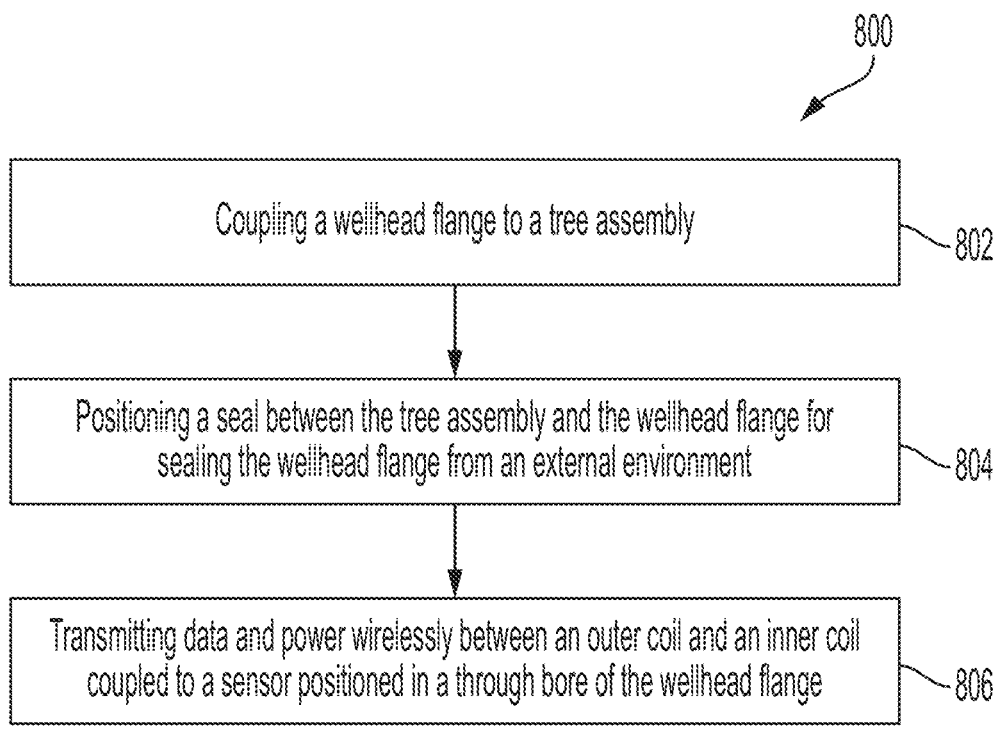
FIG. 8 is a flow-chart of a process for wirelessly transmitting power and data with respect to a sensor assembly of a wellbore according to one example of the present disclosure.

FIG. 8 is a flow-chart of a process 800 for wirelessly transmitting power and data with respect to a sensor assembly of a wellbore according to one example of the present disclosure. At block 802, a wellhead flange is coupled to a sensor assembly. The wellhead flange may be sized to receive the sensor assembly. The sensor assembly can be used in subsea or surface wells.

At block 804 a seal is positioned between the sensor assembly and the wellhead flange for sealing the wellhead flange from an external environment. The wellhead flange can create a pressure barrier between fluids in a well and an external environment. The pressure barrier may prevent fluids from the well from migrating into the external environment. The seal may be the only seal sealing the wellhead flange from the external environment. In some examples, the sensor assembly having only one seal may prevent leak paths from forming in the pressure barrier and provide the sensor assembly with additional resilience to environmental conditions. The seal can further prevent well fluids from leaking out into the environment. For example, the seal may be resistant to degradation that may be caused by compression cycles or degradation that may be caused by temperature cycles. Resistance to degradation that may be caused by temperature cycles may allow the tree assembly to operate at low temperatures, such as temperatures below zero degrees Celsius.

At block 806, data and power are transmitted wirelessly between an outer coil and an inner coil that are coupled to a sensor positioned in a through bore of the wellhead flange. By energizing the inner coil, a first magnetic field may be generated that can cause a current in the outer coil for transmitting power and data to the outer coil. Similarly, by energizing the outer coil, a second magnetic field may be generated that can cause a current in the inner coil for transmitting power and data to the inner coil. The outflow pressure may be a pressure that can cause fluids such as hydrocarbons to travel from a bottom of a well to a top of the well where the fluids can be extracted and sent to a flow line. Triggering an alarm based on a decrease in the outflow pressure may prevent halted production and minimize a downtime of the well during a production process. The sensor may be a temperature sensor, a pressure sensor, or any other type of sensor. The sensor may include multiple sensors or transducers connected to one inner coil. Additionally or alternatively, the sensor may include multiple independent sensors or transducers, each corresponding to an additional inner coil and an additional outer coil that have been communicatively coupled for transmitting power and data wirelessly with respect to the sensor assembly. The outer coil may be connected to a junction box or wellbore monitoring system with a tubing-encapsulated conductor. The data from the sensor may be used for controlling wellbore operations. For example, the sensor may detect a decrease in an outflow pressure and cause the well monitoring system to trigger an alarm.

In some aspects, system, and method for transmitting data and power wirelessly are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a sensor assembly; a wellhead flange sized to receive the sensor assembly; a seal positionable between the sensor assembly and the wellhead flange for sealing the wellhead flange from an external environment; an inner coil positionable within the sensor assembly, wherein the inner coil is wirelessly couplable with an outer coil positionable around the sensor assembly for transmitting data or power with respect to the wellhead flange; and a sensor positionable in a through bore of the wellhead flange, the sensor couplable with the inner coil for transmitting and receiving data or power with respect to the wellhead flange.

Example 2 is the system of example 1, wherein the inner coil is a first inner coil, wherein the outer coil is a first outer coil, further comprising: a second inner coil positionable within the sensor assembly that is wirelessly couplable with a second outer coil positionable proximate to the sensor assembly for transmitting data or power with respect to the wellhead flange; and a second sensor positionable in a through bore of the wellhead flange, the second sensor being couplable with the second inner coil.

Example 3 is the system of any of examples 1-2, wherein the second inner coil is non-coplanar with respect to the first inner coil, wherein the second outer coil is non-coplanar with respect to the first outer coil, and wherein the second sensor is different than the first sensor.

Example 4 is the system of example 1, wherein the sensor assembly comprises: a first material that is non-magnetic; and a second material that is magnetically permeable.

Example 5 is the system of any of examples 1 and 4, wherein the sensor assembly comprises: a first end that comprises the first material and that is sized to receive the wellhead flange; and a second end positioned opposite the first end and distal with respect to the wellhead flange, wherein the second end comprises the second material for defining a magnetically permeable path through the second end and between the inner coil and the outer coil for transmitting data or power with respect to the wellhead flange.

Example 6 is the system of any of examples 1 and 4, wherein the sensor assembly comprises: a first end that comprises the second material and is sized to receive the wellhead flange for defining a magnetically permeable path through the first end and between the inner coil and the outer coil for transmitting data or power with respect to the wellhead flange; and a second end positioned opposite the first end and distal with respect to the wellhead flange, the second end comprising the first material.

Example 7 is the system of example 1, wherein the sensor assembly comprises a first metal and a second metal, and wherein power is generatable locally by a temperature difference between the first metal and the second metal via the Seebeck Effect.

Example 8 is a system comprising: a sensor positionable in a through bore of a wellhead flange, wherein the wellhead flange is sized to receive a sensor assembly; a seal positionable between the sensor assembly and the wellhead flange for sealing the wellhead flange from an external environment; and an inner coil positionable within the sensor assembly, wherein the inner coil is wirelessly couplable with an outer coil positionable proximate to the sensor assembly for transmitting data or power with respect to the wellhead flange, and wherein the inner coil is couplable to the sensor.

Example 9 is the system of example 8, wherein the inner coil is a first inner coil, wherein the outer coil is a first outer coil, further comprising: a second inner coil positionable within the sensor assembly that is wirelessly couplable with a second outer coil positionable proximate to the sensor assembly for transmitting data or power with respect to the wellhead flange; and a second sensor positionable in a through bore of the wellhead flange, the second sensor being couplable with the second inner coil.

Example 10 is the system of any of examples 8-9, wherein the second inner coil is non-coplanar with respect to the first inner coil, wherein the second outer coil is non-coplanar with respect to the first outer coil, and wherein the second sensor is different than the first sensor.

Example 11 is the system of example 8, wherein the sensor assembly comprises: a first material that is non-magnetic; and a second material that is magnetically permeable.

Example 12 is the system of any of examples 8 and 11, wherein the sensor assembly comprises: a first end that comprises the first material and that is sized to receive the wellhead flange; and a second end positioned opposite the first end and distal with respect to the wellhead flange, wherein the second end comprises the second material for defining a magnetically permeable path through the second end and between the inner coil and the outer coil for transmitting data or power with respect to the wellhead flange.

Example 13 is the system of any of examples 8 and 11, wherein the sensor assembly comprises: a first end that comprises the second material and is sized to receive the wellhead flange for defining a magnetically permeable path through the first end and between the inner coil and the outer coil for transmitting data or power with respect to the wellhead flange; and a second end positioned opposite the first end and distal with respect to the wellhead flange, the second end comprising the first material.

Example 14 is the system of example 8, wherein the sensor assembly comprises a first metal and a second metal, and wherein power is generatable locally by a temperature difference between the first metal and the second metal via the Seebeck Effect.

Example 15 is a method comprising: coupling a wellhead flange to a sensor assembly; positioning a seal between the sensor assembly and the wellhead flange for sealing the wellhead flange from an external environment; and transmitting data or power with respect to the wellhead flange wirelessly between an outer coil and an inner coil that is coupled to a sensor positioned in a through bore of the wellhead flange.

Example 16 is the method of example 15, further comprising: providing a first material that is non-magnetic to the sensor assembly; and providing a second material that is magnetically permeable to the sensor assembly.

Example 17 is the method of any of examples 15-16, further comprising: providing the sensor assembly with a first end that includes the first material and that is couplable to the wellhead flange; and providing the sensor assembly with a second end opposite the first end and distal with respect to the wellhead flange, wherein the second end includes the second material for defining a magnetically permeable path through the second end and between the inner coil and the outer coil for transmitting data or power with respect to the wellhead flange.

Example 18 is the method of any of examples 15-16, further comprising: a first end that comprises the second material and is couplable to the wellhead flange for defining a magnetically permeable path through the first end and between the inner coil and the outer coil for transmitting data or power with respect to the wellhead flange; and a second end positioned opposite the first end and distal with respect to the wellhead flange, the second end comprising the first material.

Example 19 is the method of example 15, further comprising: providing the sensor assembly with a first metal and a second metal, and wherein power is generatable locally by a temperature difference between the first metal and the second metal via the Seebeck Effect.

Example 20 is the method of example 15, further comprising: positioning a second inner coil within the sensor assembly that is wirelessly communicatively couplable with a second outer coil positionable proximate to the sensor assembly for transmitting data or power; and positioning a second sensor between the sensor assembly and a second through bore of the wellhead flange, the second sensor being couplable with the second inner coil.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a sensor assembly;
   a wellhead flange sized to receive the sensor assembly;
   a seal positionable between the sensor assembly and the wellhead flange for sealing the wellhead flange from an external environment;
   an inner coil positionable within the sensor assembly, wherein the inner coil is wirelessly couplable with an outer coil positionable around the sensor assembly for transmitting data or power with respect to the wellhead flange, and wherein the inner coil and the outer coil form a transformer with a non-ferromagnetic coupling; and
   a sensor positionable in a through bore of the wellhead flange, the sensor couplable with the inner coil for transmitting and receiving data or power with respect to the wellhead flange.

2. The system of claim 1, wherein the inner coil is a first inner coil, wherein the outer coil is a first outer coil, further comprising:
   a second inner coil positionable within the sensor assembly that is wirelessly couplable with a second outer coil positionable proximate to the sensor assembly for transmitting data or power with respect to the wellhead flange; and
   a second sensor positionable in a through bore of the wellhead flange, the second sensor being couplable with the second inner coil.

3. The system of claim 2, wherein the second inner coil is non-coplanar with respect to the first inner coil, wherein the second outer coil is non-coplanar with respect to the first outer coil, and wherein the second sensor is different than the sensor.

4. The system of claim 1, wherein the sensor assembly comprises:
   a first material that is non-magnetic; and
   a second material that is magnetically permeable.

5. The system of claim 4, wherein the sensor assembly comprises:
   a first end that comprises the first material and that is sized to receive the wellhead flange; and
   a second end positioned opposite the first end and distal with respect to the wellhead flange, wherein the second end comprises the second material for defining a magnetically permeable path through the second end and between the inner coil and the outer coil for transmitting data or power with respect to the wellhead flange.

6. The system of claim 4, wherein the sensor assembly comprises:
   a first end that comprises the second material and is sized to receive the wellhead flange for defining a magnetically permeable path through the first end and between the inner coil and the outer coil for transmitting data or power with respect to the wellhead flange; and
   a second end positioned opposite the first end and distal with respect to the wellhead flange, the second end comprising the first material.

7. The system of claim 1, wherein the seal is the only seal included in the system.

8. A system comprising:
   a sensor positionable in a through bore of a wellhead flange, wherein the wellhead flange is sized to receive a sensor assembly;
   a seal positionable between the sensor assembly and the wellhead flange for sealing the wellhead flange from an external environment; and
   an inner coil positionable within the sensor assembly, wherein the inner coil is wirelessly couplable with an outer coil positionable proximate to the sensor assembly for transmitting data or power with respect to the wellhead flange, wherein the inner coil and the outer coil form a transformer with a non-ferromagnetic coupling, and wherein the inner coil is couplable with the sensor.

9. The system of claim 8, wherein the inner coil is a first inner coil, wherein the outer coil is a first outer coil, further comprising:

a second inner coil positionable within the sensor assembly that is wirelessly couplable with a second outer coil positionable proximate to the sensor assembly for transmitting data or power with respect to the wellhead flange; and a second sensor positionable in a through bore of the wellhead flange, the second sensor being couplable with the second inner coil.

10. The system of claim 9, wherein the second inner coil is non-coplanar with respect to the first inner coil, wherein the second outer coil is non-coplanar with respect to the first outer coil, and wherein the second sensor is different than the sensor.

11. The system of claim 8, wherein the sensor assembly comprises:

a first material that is non-magnetic; and a second material that is magnetically permeable.

12. The system of claim 11, wherein the sensor assembly comprises:

a first end that comprises the first material and that is sized to receive the wellhead flange; and a second end positioned opposite the first end and distal with respect to the wellhead flange, wherein the second end comprises the second material for defining a magnetically permeable path through the second end and between the inner coil and the outer coil for transmitting data or power with respect to the wellhead flange.

13. The system of claim 11, wherein the sensor assembly comprises:

a first end that comprises the second material and is sized to receive the wellhead flange for defining a magnetically permeable path through the first end and between the inner coil and the outer coil for transmitting data or power with respect to the wellhead flange; and a second end positioned opposite the first end and distal with respect to the wellhead flange, the second end comprising the first material.

14. The system of claim 8, wherein the sensor assembly comprises a first metal and a second metal, and wherein power is generatable locally by a temperature difference between the first metal and the second metal via the Seebeck Effect.

15. A method comprising:

coupling a wellhead flange to a sensor assembly;

positioning a seal between the sensor assembly and the wellhead flange for sealing the wellhead flange from an external environment; and transmitting data or power with respect to the wellhead flange wirelessly between an outer coil and an inner coil that is coupled to a sensor positioned in a through bore of the wellhead flange, wherein the inner coil and the outer coil form a transformer with a non-ferromagnetic coupling.

16. The method of claim 15, further comprising:

providing a first material that is non-magnetic to the sensor assembly; and providing a second material that is magnetically permeable to the sensor assembly.

17. The method of claim 16, further comprising:

providing the sensor assembly with a first end that includes the first material and that is couplable to the wellhead flange; and providing the sensor assembly with a second end positioned opposite the first end and distal with respect to the wellhead flange, wherein the second end includes the second material for defining a magnetically permeable path through the second end and between the inner coil and the outer coil for transmitting data or power with respect to the wellhead flange.

18. The method of claim 16, further comprising:

a first end that comprises the second material and is couplable to the wellhead flange for defining a magnetically permeable path through the first end and between the inner coil and the outer coil for transmitting data or power with respect to the wellhead flange; and a second end positioned opposite the first end and distal with respect to the wellhead flange, the second end comprising the first material.

19. The method of claim 15, further comprising:

providing the sensor assembly with a first metal and a second metal, and wherein power is generatable locally by a temperature difference between the first metal and the second metal via the Seebeck Effect.

20. The method of claim 15, further comprising:

positioning a second inner coil within the sensor assembly that is wirelessly communicatively couplable with a second outer coil positionable proximate to the sensor assembly for transmitting data or power; and positioning a second sensor between the sensor assembly and a second through bore of the wellhead flange, the second sensor being couplable with the second inner coil.

* * * * *